(12) United States Patent
Umeyama et al.

(10) Patent No.: US 12,338,750 B2
(45) Date of Patent: Jun. 24, 2025

(54) FUEL CELL FLUID MACHINE

(71) Applicant: KABUSHIKI KAISHA TOYOTA JIDOSHOKKI, Aichi-ken (JP)

(72) Inventors: Ryo Umeyama, Kariya (JP); Hidefumi Mori, Kariya (JP); Kenta Akimoto, Kariya (JP); Yuya Matsuoka, Kariya (JP)

(73) Assignee: KABUSHIKI KAISHA TOYOTA JIDOSHOKKI, Aichi-Ken (JP)

( * ) Notice: Subject to any disclaimer, the term of this patent is extended or adjusted under 35 U.S.C. 154(b) by 458 days.

(21) Appl. No.: 17/987,056

(22) Filed: Nov. 15, 2022

(65) Prior Publication Data

US 2023/0207842 A1 Jun. 29, 2023

(30) Foreign Application Priority Data

Nov. 25, 2021 (JP) ................. 2021-191335

(51) Int. Cl.
| | |
|---|---|
| *F01D 9/04* | (2006.01) |
| *F01D 5/04* | (2006.01) |
| *F04B 35/04* | (2006.01) |
| *F04B 39/00* | (2006.01) |
| *B60L 50/72* | (2019.01) |
| *F04B 49/12* | (2006.01) |
| *H01M 8/04111* | (2016.01) |

(52) U.S. Cl.
CPC .............. *F01D 9/045* (2013.01); *F04B 35/04* (2013.01); *F04B 39/00* (2013.01); *B60L 50/72* (2019.02); *F01D 5/048* (2013.01); *F04B 49/12* (2013.01); *H01M 8/04111* (2013.01)

(58) Field of Classification Search
CPC . F01D 5/048; F01D 9/045; F02C 6/12; F05D 2220/40
See application file for complete search history.

(56) References Cited

U.S. PATENT DOCUMENTS

| | | |
|---|---|---|
| 4,565,505 A | 1/1986 | Woollenweber |
| 5,094,587 A | 3/1992 | Woollenweber |
| 5,518,365 A | 5/1996 | Baets et al. |
| 9,708,913 B2 | 7/2017 | Mateo et al. |
| 9,810,225 B2 * | 11/2017 | Yokoyama .............. F04D 17/10 |
| 10,519,812 B2 | 12/2019 | Itoh et al. |
| 2010/0104424 A1 | 4/2010 | Anschel et al. |

(Continued)

FOREIGN PATENT DOCUMENTS

| | | |
|---|---|---|
| CH | 138397 A | 5/1930 |
| DE | 102008049689 A1 | 4/2010 |

(Continued)

*Primary Examiner* — Christopher R Legendre
(74) *Attorney, Agent, or Firm* — Greenblum & Bernstein, P.L.C.

(57) ABSTRACT

A fuel cell fluid machine includes a rotary shaft, an electric motor, a compression unit, and a rotation assist unit. The rotation assist unit includes a turbine wheel and a turbine housing. Exhaust gas discharged from a fuel cell stack is introduced to the turbine chamber. The exhaust gas then flows in the radial direction of the rotary shaft and is discharged in the axial direction of the rotary shaft. This rotates the turbine wheel. A diameter of the turbine wheel and a diameter of the shroud surface gradually increase from an upstream side to a downstream side in a flowing direction of the exhaust gas.

4 Claims, 2 Drawing Sheets

(56) References Cited

U.S. PATENT DOCUMENTS

| | | | |
|---|---|---|---|
| 2011/0097632 A1 | 4/2011 | Sumser et al. | |
| 2014/0370412 A1 | 12/2014 | Sumser et al. | |
| 2016/0160672 A1 | 6/2016 | Takata et al. | |
| 2020/0378276 A1 | 12/2020 | Ikeya | |
| 2023/0207842 A1* | 6/2023 | Umeyama | F04B 39/00 429/400 |

FOREIGN PATENT DOCUMENTS

| | | |
|---|---|---|
| DE | 102012023011 A1 | 6/2014 |
| DE | 102013021558 A1 | 7/2014 |
| JP | S60501016 A | 7/1985 |
| JP | H09144550 A | 6/1997 |
| JP | H11-190201 A | 7/1999 |
| JP | 2013-204422 A | 10/2013 |
| JP | 2014-506974 A | 3/2014 |
| JP | 2015505927 A | 2/2015 |
| JP | 2018-003619 A | 1/2018 |
| JP | 2021-008869 A | 1/2021 |
| WO | WO-8404136 A1 * | 10/1984 |
| WO | WO2014/203372 A1 | 12/2014 |
| WO | WO2019/159744 A1 | 8/2019 |
| WO | WO2020/120254 A1 | 6/2020 |

\* cited by examiner

FUEL CELL FLUID MACHINE

BACKGROUND

1. Field

The present disclosure relates to a fuel cell fluid machine.

2. Description of Related Art

Fuel cell fluid machines that include a rotary shaft, an electric motor, and a compression unit have been known in the art. The electric motor rotates the rotary shaft. The compression unit is driven by rotation of the rotary shaft. The compression unit compresses air that is supplied to a fuel cell stack. Some fuel cell fluid machines include a rotation assist unit that assists rotation of the rotary shaft. A rotation assist unit includes a turbine wheel and a turbine housing, for example, as disclosed in Japanese Laid-Open Patent Publication No. 2013-204422. The turbine wheel is coupled to the rotary shaft. The turbine wheel rotates integrally with the rotary shaft. A turbine housing defines a turbine chamber. The turbine chamber accommodates the turbine wheel. The turbine housing includes a shroud surface, which faces the turbine wheel. In this type of fuel cell fluid machine, exhaust gas discharged from the fuel cell stack is introduced to the turbine chamber. The exhaust gas then flows in the radial direction of the rotary shaft and is discharged in the axial direction of the rotary shaft, which rotates the turbine wheel.

In the above-described fuel cell fluid machine, a turbine efficiency η is related to a velocity ratio U/C as shown in FIG. 3. The turbine efficiency η has a characteristic of having an upward convex shape in relation to the velocity ratio U/C. Therefore, the turbine efficiency η has a local maximum ηmax at a specific velocity ratio U/C0.

The velocity ratio U/C is expressed by the ratio of a turbine wheel circumferential velocity U to an isentropic velocity C. The turbine wheel circumferential velocity U is the rotation speed in the circumferential direction of the turbine wheel. The turbine wheel circumferential velocity U is expressed by the product of the number of revolutions of the turbine wheel and the inducer diameter, which is the diameter of the turbine wheel on the upstream side in the flowing direction of the exhaust gas. The isentropic velocity C is expressed as a function of the temperature and the pressure of the exhaust gas. The isentropic velocity C refers to a theoretical gas velocity that would be obtained if exhaust gas of a certain temperature and a certain pressure is expanded to have a specific temperature and a specific pressure.

The temperature and the pressure of exhaust gas discharged from a fuel cell stack are significantly lower than those of the exhaust gas of an engine. Thus, since the isentropic velocity C is relatively low in a fuel cell fluid machine, the velocity ratio U/C has a value U/Cx, which is greater than the specific velocity ratio U/C0. Accordingly, the turbine efficiency η has a value ηx, which is less than the local maximum ηmax.

The temperature and the pressure of exhaust gas discharged from the fuel cell stack are determined solely by a request flow rate, a request temperature, and a request pressure of the air supplied to the fuel cell stack. Accordingly, the isentropic velocity C of the fuel cell fluid machine is determined solely by the request flow rate, the request temperature, and the request pressure of the air supplied to the fuel cell stack. It is thus necessary to reduce the turbine wheel circumferential velocity U in order to improve the turbine efficiency η.

In order to reduce the turbine wheel circumferential velocity U, the number of revolutions of the turbine wheel may be reduced, for example. However, in view of assisting rotation of the rotary shaft, it is not desirable to reduce the number of revolutions of the turbine wheel. In this respect, the inducer diameter may be reduced, which is the diameter of the turbine wheel on the upstream side in the flowing direction of the exhaust gas. For example, the diameter of the turbine wheel may gradually decrease from the upstream side toward the downstream side in the flowing direction of the exhaust gas. In this case, the exducer diameter, which is the diameter of the turbine wheel on the downstream side in the flowing direction of the exhaust gas, is reduced as the inducer diameter of the turbine wheel is reduced. Accordingly, the flow of the exhaust gas created by rotation of the turbine wheel is less likely to flow smoothly through the turbine chamber. This increases the pressure on the upstream side in the turbine chamber in the flowing direction of the exhaust gas and thus increases the pressure at the inlet of the fuel cell stack. As a result, the driving force consumed by the compression unit increases significantly.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a fuel cell fluid machine is provided that includes a rotary shaft, an electric motor that is configured to rotate the rotary shaft, a compression unit that is configured to use rotation of the rotary shaft to compress air supplied to a fuel cell stack, and a rotation assist unit that is configured to assist rotation of the rotary shaft. The rotation assist unit includes a turbine wheel that is provided on the rotary shaft and is configured to rotate integrally with the rotary shaft, and a turbine housing that defines a turbine chamber and includes a shroud surface. The turbine chamber accommodates the turbine wheel, and the shroud surface faces the turbine wheel. The turbine wheel is configured such that an exhaust gas, which is discharged from the fuel cell stack and introduced to the turbine chamber, is conducted in a radial direction of the rotary shaft to the turbine wheel and discharged in an axial direction of the rotary shaft to rotate the turbine wheel. A diameter of the turbine wheel and a diameter of the shroud surface gradually increase from an upstream side to a downstream side in a flowing direction of the exhaust gas.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A fuel cell fluid machine 12 according to one embodiment will now be described with reference to FIGS. 1 to 3. The fuel cell fluid machine 12 of the present embodiment is used in a fuel cell system 10 mounted, for example, on a fuel cell electric vehicle.

Fuel Cell System 10

Figure 1:
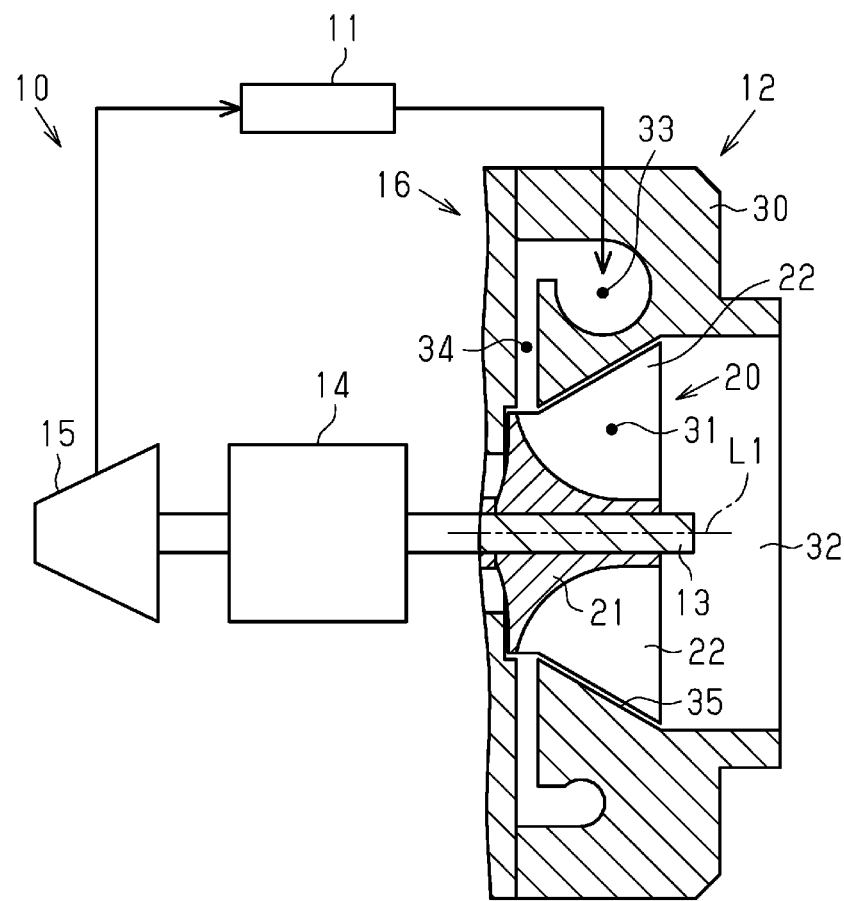
FIG. 1 is a cross-sectional side view illustrating a fuel cell fluid machine according to one embodiment.

As shown in FIG. 1, the fuel cell system 10 includes a fuel cell stack 11 and the fuel cell fluid machine 12. The fuel cell fluid machine 12 compresses air that acts as an oxidant gas. The fuel cell stack 11 receives air that has been compressed by the fuel cell fluid machine 12. The fuel cell stack 11, for example, includes multiple cells. Each cell has a structure in which an oxygen electrode and a hydrogen electrode are stacked together with an electrolyte membrane arranged between the electrodes.

The fuel cell stack 11 generates power through a chemical reaction between hydrogen, which is a fuel gas, and oxygen contained in the air. Oxygen, which contributes to power generation in the fuel cell stack 11, accounts for only 20% of the air. Thus, approximately 80% of the air supplied to the fuel cell stack 11 is discharged as exhaust gas from the fuel cell stack 11 without contributing to power generation in the fuel cell stack 11.

The fuel cell stack 11 is electrically connected to a traveling motor (not shown). The traveling motor is driven by power generated in the fuel cell stack 11. Driving force of the traveling motor is transmitted to an axle through a driving force transmission mechanism (not shown), and the vehicle travels at a vehicle speed corresponding to a depression amount of the accelerator pedal.

Overall Configuration of Fuel Cell Fluid Machine 12

The fuel cell fluid machine 12 includes a rotary shaft 13, an electric motor 14, and a compression unit 15. The electric motor 14 rotates the rotary shaft 13. The compression unit 15 is driven by rotation of the rotary shaft 13. In the present embodiment, the compression unit 15 is a compressor impeller coupled to a first end of the rotary shaft 13. The compression unit 15 compresses air that is supplied to the fuel cell stack 11.

Configuration of Rotation Assist Unit 16

The fuel cell fluid machine 12 includes a rotation assist unit 16. The rotation assist unit 16 assists rotation of the rotary shaft 13. The rotation assist unit 16 includes a turbine wheel 20 and a turbine housing 30. The turbine wheel 20 is provided on the rotary shaft 13. Specifically, the turbine wheel 20 is coupled to a second end of the rotary shaft 13. The turbine wheel 20 rotates integrally with the rotary shaft 13.

The turbine housing 30 defines a turbine chamber 31. The turbine chamber 31 accommodates the turbine wheel 20. The turbine housing 30 is tubular and has a circular outlet port 32. The outlet port 32 is connected to the turbine chamber 31. An axis of the outlet port 32 agrees with an axis L1 of the rotary shaft 13. The turbine housing 30 includes a suction chamber 33 and an inlet port 34. The suction chamber 33 is located around the turbine chamber 31 and extends about the axis of the outlet port 32. Exhaust gas discharged from the fuel cell stack 11 is drawn into the suction chamber 33. The inlet port 34 connects the turbine chamber 31 and the suction chamber 33 to each other. The inlet port 34 extends in a radial direction of the rotary shaft 13. The inlet port 34 conducts the exhaust gas drawn into the suction chamber 33 to the turbine chamber 31 in a radial direction of the rotary shaft 13.

The exhaust gas is discharged from the fuel cell stack 11 and introduced to the turbine chamber 31. The exhaust gas is conducted in a radial direction of the rotary shaft 13 to the turbine wheel 20 and discharged in the axial direction of the rotary shaft 13, rotating the turbine wheel 20. The turbine wheel 20 is rotated by kinetic energy of the exhaust gas that is introduced to the turbine chamber 31. The kinetic energy of the exhaust gas is converted into the rotational energy of the turbine wheel 20. The rotational energy generated in the turbine wheel 20 assists rotation of the rotary shaft 13. The exhaust gas that has passed through the turbine chamber 31 is discharged to the outside through the outlet port 32.

Shroud Surface 35

Figure 2:
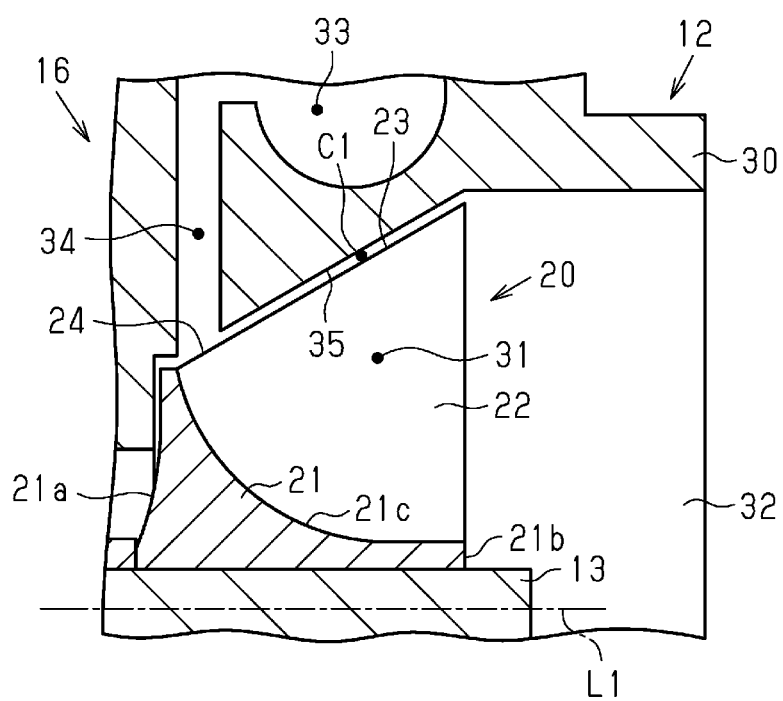
FIG. 2 is an enlarged cross-sectional view showing a turbine wheel and its surroundings.

As shown in FIG. 2, the turbine housing 30 includes a shroud surface 35, which faces the turbine wheel 20. The shroud surface 35 defines the turbine chamber 31. The shroud surface 35 surrounds the turbine wheel 20. The shroud surface 35 connects an open edge of the inlet port 34 that corresponds to the turbine chamber 31 to the inner circumferential surface of the outlet port 32. The diameter of the shroud surface 35 gradually increases from the inlet port 34 toward the outlet port 32. The diameter of the shroud surface 35 thus gradually increases from the upstream side to the downstream side in the flowing direction of the exhaust gas.

Hub 21

The turbine wheel 20 includes a hub 21 and blades 22. The hub 21 rotates integrally with the rotary shaft 13. The hub 21 is attached to the second end of the rotary shaft 13. The hub 21 has a substantially conical shape with its outer diameter gradually increasing from a back surface 21a to a distal surface 21b. The hub 21 includes an outer circumferential surface 21c. The diameter of the outer circumferential surface 21c gradually decreases from the back surface 21a to the distal surface 21b. The direction in which the exhaust gas flows in the turbine chamber 31 is the direction from the inlet port 34 toward the outlet port 32. The diameter of the outer circumferential surface 21c of the hub 21 thus gradually decreases from the upstream side to the downstream side in the flowing direction of the exhaust gas. The outer circumferential surface 21c of the hub 21 is a concave surface recessing toward the axis L1 of the rotary shaft 13. The outer diameter of the back surface 21a is the maximum diameter of the hub 21. The outer diameter of the distal surface 21b is the minimum diameter of the hub 21.

Blades 22

The blades 22 are provided on the outer circumferential surface 21c of the hub 21. The blades 22 protrude from the outer circumferential surface 21c of the hub 21. The blades 22 are arranged on the outer circumferential surface 21c of the hub 21 at equal intervals in the circumferential direction of the hub 21. The blades 22 are arranged in the circumferential direction of the hub 21. The turbine wheel 20 is accommodated in the turbine chamber 31 with the blades 22 facing the shroud surface 35. Each blade 22 includes an outer edge 23, which faces the shroud surface 35. The diameter of the outer edges 23 gradually increases from the back surface 21a to the distal surface 21b of the hub 21. The diameter of the blades 22 thus gradually increases from the upstream side to the downstream side in the flowing direction of the exhaust gas. As described above, the diameter of the turbine wheel 20 and the diameter of the shroud surface 35 gradually increase from the upstream side to the downstream side in the flowing direction of the exhaust gas.

The outer edges 23 of the blades 22 extend along the shroud surface 35. A clearance C1 between the outer edge 23 of each blade 22 and the shroud surface 35 is constant in the flowing direction of the exhaust gas. The inlet port 34 faces the blades 22. Each blade 22 thus includes a facing edge 24, which faces the inlet port 34. The facing edge 24 of each blade 22 faces the inlet port 34 and extends in relation to the axial direction of the rotary shaft 13 so as to separate away from the rotary shaft 13 as the diameter of the hub 21 decreases from the maximum diameter. The diameter of the facing edges 24 of the blades 22 is the inducer diameter, which is the diameter of the turbine wheel 20 on the upstream side in the flowing direction of the exhaust gas. The diameter of the ends of the outer edges 23 of the blades 22 that are located at the distal surface 21b of the hub 21 is the exducer diameter, which is the diameter of the turbine wheel 20 on the downstream side in the flowing direction of the exhaust gas.

Operation

Operation of the present embodiment will now be described.

When the electric motor 14 rotates the rotary shaft 13, the compression unit 15 is driven by rotation of the rotary shaft 13, so that the compression unit 15 compresses air. The air compressed by the compression unit 15 is supplied to the fuel cell stack 11. Oxygen contained in the air supplied to the fuel cell stack 11 contributes to power generation in the fuel cell stack 11. The exhaust gas discharged from the fuel cell stack 11 is drawn into the suction chamber 33. The exhaust gas drawn into the suction chamber 33 is introduced to the turbine chamber 31 through the inlet port 34. The kinetic energy of the exhaust gas introduced to the turbine chamber 31 rotates the turbine wheel 20. The kinetic energy of the exhaust gas is converted into the rotational energy of the turbine wheel 20. The rotational energy generated in the turbine wheel 20 assists rotation of the rotary shaft 13. The exhaust gas that has passed through the turbine chamber 31 is discharged to the outside through the outlet port 32.

Figure 3:
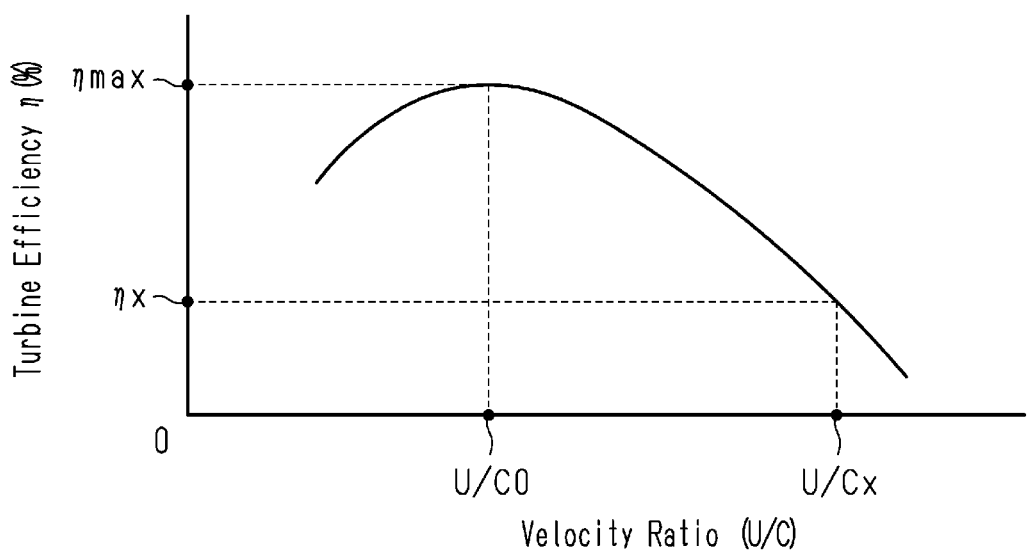
FIG. 3 is a graph showing a relationship between a turbine efficiency and a velocity ratio.

The graph of FIG. 3 shows the relationship between a turbine efficiency η and a velocity ratio U/C. As shown in FIG. 3, the turbine efficiency η has a characteristic of having an upward convex shape in relation to the velocity ratio U/C. Therefore, the turbine efficiency η has a local maximum ηmax at a specific velocity ratio U/C0.

In the above-described fuel cell fluid machine 12, the turbine efficiency η is related to the velocity ratio U/C. The velocity ratio U/C is expressed by the ratio of a turbine wheel circumferential velocity U to an isentropic velocity C. The turbine wheel circumferential velocity U is the rotation speed in the circumferential direction of the turbine wheel 20. The turbine wheel circumferential velocity U is expressed by the product of the number of revolutions of the turbine wheel 20 and the inducer diameter, which is the diameter of the turbine wheel 20 on the upstream side in the flowing direction of the exhaust gas. The isentropic velocity C is expressed as a function of the temperature and the pressure of the exhaust gas. The isentropic velocity C refers to a theoretical gas velocity that would be obtained if exhaust gas of a certain temperature and a certain pressure is expanded to have a specific temperature and a specific pressure.

The temperature and the pressure of exhaust gas discharged from a fuel cell stack 11 are significantly lower than those of the exhaust gas of an engine. Thus, since the isentropic velocity C is relatively low in the fuel cell fluid machine 12, the velocity ratio U/C has a value U/Cx, which is greater than the specific velocity ratio U/C0. Accordingly, the turbine efficiency η has a value ηx, which is less than the local maximum ηmax.

The temperature and the pressure of exhaust gas discharged from the fuel cell stack 11 are determined solely by a request flow rate, a request temperature, and a request pressure of the air supplied to the fuel cell stack 11. Accordingly, the isentropic velocity C of the fuel cell fluid machine 12 is determined solely by the request flow rate, the request temperature, and the request pressure of the air supplied to the fuel cell stack 11. It is thus necessary to reduce the turbine wheel circumferential velocity U in order to improve the turbine efficiency η.

In order to reduce the turbine wheel circumferential velocity U, the number of revolutions of the turbine wheel 20 may be reduced, for example. However, in view of assisting rotation of the rotary shaft 13 it is not desirable to reduce the number of revolutions of the turbine wheel 20. In this respect, the inducer diameter may be reduced, which is the diameter of the turbine wheel 20 on the upstream side in the flowing direction of the exhaust gas.

The diameter of the turbine wheel 20 and the diameter of the shroud surface 35 gradually increase from the upstream side to the downstream side in the flowing direction of the exhaust gas. Since this configuration reduces the inducer diameter, which is the diameter of the turbine wheel 20 on the upstream side in the flowing direction of the exhaust gas, the turbine wheel circumferential velocity U is reduced. This causes the velocity ratio U/C to approach the specific velocity ratio U/C0, so that the turbine efficiency η approaches the local maximum ηmax. As a result, the turbine efficiency η is improved in the fuel cell fluid machine 12.

Even if the inducer diameter, which is the diameter of the turbine wheel 20 on the upstream side in the flowing direction of the exhaust gas, is reduced, the exducer diameter, which is the diameter of the turbine wheel 20 on the downstream side in the flowing direction of the exhaust gas, will not be smaller than the inducer diameter. Thus, even though the inducer diameter of the turbine wheel 20 is reduced, the exhaust gas, which flows due to rotation of the turbine wheel 20, is not prevented from flowing smoothly through the turbine chamber 31. As a result, even though the inducer diameter of the turbine wheel 20 is reduced to reduce the turbine wheel circumferential velocity U, the pressure on the upstream side in the flowing direction of the exhaust gas is prevented from increasing in the turbine chamber 31. The pressure at the inlet of the fuel cell stack 11 is therefore prevented from increasing. In this manner, the turbine efficiency η is improved without increasing the driving force consumed by the compression unit 15.

Advantages

The above-described embodiment has the following advantages.

(1) The diameter of the turbine wheel 20 and the diameter of the shroud surface 35 gradually increase from the upstream side to the downstream side in the flowing direction of the exhaust gas. Since this configuration reduces the inducer diameter, which is the diameter of the turbine wheel 20 on the upstream side in the flowing direction of the exhaust gas, the turbine wheel circumferential velocity U is reduced. This causes the velocity ratio U/C to approach the specific velocity ratio U/C0, so that the turbine efficiency η approaches the local maximum ηmax. As a result, the turbine efficiency η is improved in the fuel cell fluid machine 12. Even if the inducer diameter, which is the diameter of the turbine wheel 20 on the upstream side in the flowing direction of the exhaust gas, is reduced, the exducer diameter, which is the diameter of the turbine wheel 20 on the downstream side in the flowing direction of the exhaust gas, will not be smaller than the inducer diameter. Thus, even though the inducer diameter of the turbine wheel 20 is reduced, the exhaust gas, which flows due to rotation of the turbine wheel 20, is not prevented from flowing smoothly through the turbine chamber 31. As a result, even though the inducer diameter of the turbine wheel 20 is reduced to reduce the turbine wheel circumferential velocity U, the pressure on the upstream side in the flowing direction of the exhaust gas is prevented from increasing in the turbine chamber 31. The pressure at the inlet of the fuel cell stack 11 is therefore prevented from increasing. In this manner, the turbine efficiency η is improved without increasing the driving force consumed by the compression unit 15.

(2) The outer edges 23, which are the edges of the blades 22 facing the shroud surface 35, extend along the shroud surface 35. This structure maintains the constant clearance C1 between the outer edges 23, which are edges of the blades 22 facing the shroud surface 35, and the shroud surface 35. This further improves the turbine efficiency η.

(3) The facing edge 24 of each blade 22 faces the inlet port 34 and extends in relation to the axial direction of the rotary shaft 13 so to separate away from the rotary shaft 13 as the diameter of the hub 21 decreases from the maximum diameter. This structure maximizes the difference between the inducer diameter, which is the diameter of the turbine wheel 20 on the upstream side in the flowing direction of the exhaust gas, and the exducer diameter, which is the diameter of the turbine wheel 20 on the downstream side in the flowing direction of the exhaust gas. Thus, even if the inducer diameter of the turbine wheel 20 is reduced, the exhaust gas, which flows due to rotation of the turbine wheel 20, is more reliably prevented from flowing flow through the turbine chamber 31.

Modifications

The above-described embodiment may be modified as follows. The above-described embodiment and the following modifications can be combined as long as the combined modifications remain technically consistent with each other.

Figure 4:
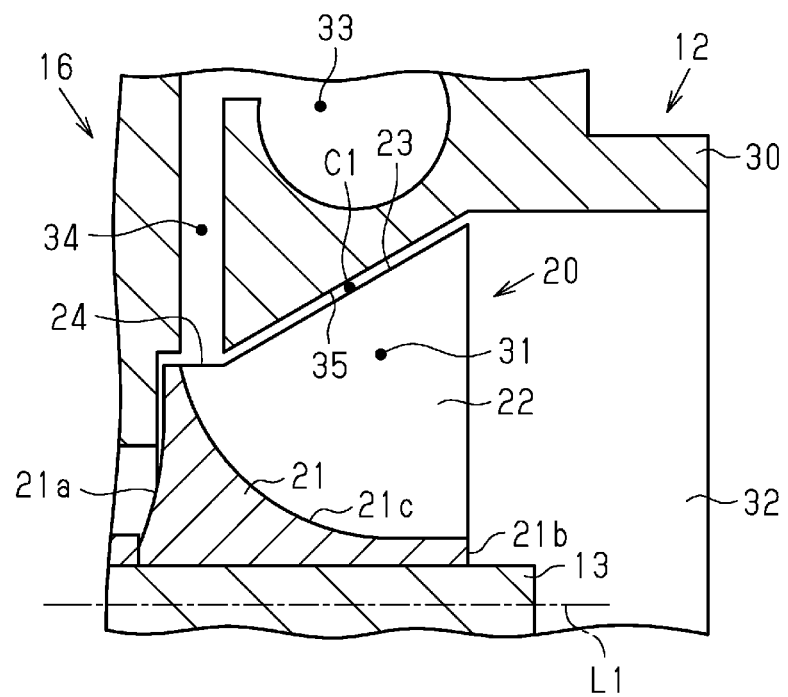
FIG. 4 is an enlarged cross-sectional view showing a turbine wheel and its surroundings according to another embodiment.

As shown in FIG. 4, the facing edge 24 of each blade 22, which faces the inlet port 34, may extend in the axial direction of the rotary shaft 13 in a section in which the diameter of the hub 21 decreases from the maximum diameter. This structure allows the kinetic energy of the exhaust gas to be readily transmitted to the turbine wheel 20. The kinetic energy of the exhaust gas is thus easily converted into the rotational energy of the turbine wheel 20, so that the rotational energy generated in the turbine wheel 20 readily assists rotation of the rotary shaft 13.

In the above-described embodiment, the outer edges 23, which are edges of the blades 22 that face the shroud surface 35, do not necessarily need to extend along the shroud surface 35. In other words, the clearance C1 does not necessarily need to be constant between the outer edges 23, which are edges of the blades 22 that face the shroud surface 35, and the shroud surface 35. For example, in the section the outer edges 23, which are edges of the blades 22 that face the shroud surface 35, and the shroud surface 35, the clearance C1 may be gradually narrowed from the upstream side toward the downstream side in the flowing direction of the exhaust gas. Alternatively, the clearance C1 may be gradually enlarged from the upstream side toward the downstream side in the flowing direction of the exhaust gas.

In the above-described embodiment, the fuel cell fluid machine 12 is not limited to the one that is used in a fuel cell electric vehicle to supply air to the fuel cell stack 11. For example, the fuel cell fluid machine 12 is not limited to the one that is mounted on a vehicle.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A fuel cell fluid machine, comprising:
a rotary shaft;
an electric motor that is configured to rotate the rotary shaft;
a compression unit that is configured to use rotation of the rotary shaft to compress air supplied to a fuel cell stack; and
a rotation assist unit that is configured to assist rotation of the rotary shaft, wherein the rotation assist unit includes:
a turbine wheel that is provided on the rotary shaft and is configured to rotate integrally with the rotary shaft, the turbine wheel including blades; and
a turbine housing that defines a turbine chamber and includes a shroud surface, the turbine chamber accommodating the turbine wheel, and the shroud surface facing an outer edge of each blade across an axial distance,
the turbine wheel is configured such that an exhaust gas, which is discharged from the fuel cell stack and introduced to the turbine chamber, is conducted in a radial direction of the rotary shaft to the turbine wheel and discharged in an axial direction of the rotary shaft to rotate the turbine wheel, and
a diameter of the shroud surface increases continuously across the axial distance in a flowing direction of the exhaust gas, and
a diameter of each outer edge increases continuously, in the flowing direction of the exhaust gas, from a minimum diameter of each outer edge at an upstream side thereof across the axial distance.

2. The fuel cell fluid machine according to claim 1, wherein the turbine wheel further includes:
a hub including an outer circumferential surface, a diameter of the outer circumferential surface decreasing in the flowing direction of the exhaust gas,
the blades being arranged in a circumferential direction of the hub.

3. The fuel cell fluid machine according to claim 2, wherein
the turbine housing includes an inlet port that faces the blades and introduces the exhaust gas into the turbine chamber, and
a facing edge of each of the blades faces the inlet port and extends in relation to the axial direction of the rotary shaft so as to separate away from the rotary shaft along a direction in which a diameter of the hub decreases from a maximum diameter.

4. The fuel cell fluid machine according to claim 2, wherein
the turbine housing includes an inlet port that faces the blades and introduces the exhaust gas, and
a facing edge of each of the blades faces the inlet port and extends in relation to the axial direction of the rotary shaft so as to extend in the axial direction of the rotary shaft along a direction in which a diameter of the hub decreases from a maximum diameter.

* * * * *